United States Patent
Davis

(10) Patent No.: US 6,848,476 B2
(45) Date of Patent: Feb. 1, 2005

(54) TUNING CABLE

(75) Inventor: Myles E. Davis, Milford, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/461,700

(22) Filed: Jun. 13, 2003

(65) Prior Publication Data

US 2004/0250865 A1 Dec. 16, 2004

(51) Int. Cl.[7] .............................................. F16L 55/04
(52) U.S. Cl. ...................... 138/26; 138/30; 138/112; 138/114; 181/256
(58) Field of Search .................... 138/26, 30, 112, 138/114; 181/222, 232, 238, 256, 257, 275, 281

(56) References Cited

U.S. PATENT DOCUMENTS

| | | | | |
|---|---|---|---|---|
| 3,323,305 A | | 6/1967 | Klees | |
| 4,611,633 A | * | 9/1986 | Buchholz et al. | 138/26 |
| 5,094,271 A | * | 3/1992 | Fritz et al. | 138/30 |
| 5,143,122 A | * | 9/1992 | Adkins | 138/109 |
| 5,582,006 A | | 12/1996 | Phillips | |
| 5,894,051 A | | 4/1999 | Andreussi et al. | |
| 6,016,845 A | * | 1/2000 | Quigley et al. | 138/125 |
| 6,119,728 A | * | 9/2000 | Seidel-Peschmann et al. | 138/26 |
| 6,142,189 A | | 11/2000 | Bhattacharyya | |
| 6,155,378 A | | 12/2000 | Qatu et al. | |
| 6,240,964 B1 | * | 6/2001 | Cooper et al. | 138/30 |
| 6,269,841 B1 | | 8/2001 | Chen et al. | |
| 6,279,613 B1 | | 8/2001 | Chen et al. | |
| 6,287,508 B1 | | 9/2001 | Stripe | |
| 6,338,363 B1 | * | 1/2002 | Chen et al. | 138/26 |
| 6,360,777 B1 | * | 3/2002 | Bae | 138/30 |
| 6,478,053 B2 | * | 11/2002 | Zanardi | 138/30 |
| 6,591,870 B1 | * | 7/2003 | Bhattacharyya et al. | 138/26 |
| 2003/0193115 A1 | * | 10/2003 | Bhattacharyya et al. | 264/328.8 |

* cited by examiner

Primary Examiner—James Hook
(74) Attorney, Agent, or Firm—Rader, Fishman & Grauer PLLC

(57) ABSTRACT

A tuning cable assembly comprising a reinforced tube, a tuning cable placed within said reinforced tube, where the tuning cable is comprised of a thermoset material or a cross-linked thermoplastic material, and a narrow annular cavity formed between the inner surface of the reinforced tube and the outer surface of the tuning cable. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope or meaning of the claims.

19 Claims, 4 Drawing Sheets

TUNING CABLE

TECHNICAL FIELD

The present invention relates to a tuning cable and in particular to a thermoset tuning cable placed within a reinforced tube for attenuating pressure pulsations in the presence of fluid flow.

BACKGROUND OF THE INVENTION

Fluid pumps, whether driven by an internal combustion engine, an electric motor or by fluid system valves, have pressure fluctuations or pulses in the associated fluid line in the form of a fluid ripple. The fluid ripple undesirably generates audible and objectionable noise within the fluid pump itself and may also excite components downstream of the fluid pump (e.g., the steering gear in power steering systems), further increasing unwanted noise generation. Apart from the noise itself, the existence of a fluid ripple reduces the operational efficiency of the fluid pump. The pressure fluctuations are generated by pistons, gerotors, gears, vanes or other fluid displacement elements within the fluid pump, and at a frequency that is typically dependent upon the pump speed.

Tuning cables are used in the known art to attenuate fluid ripple frequencies in power steering systems. The power steering tuning cables are typically formed from wrapped steel or thermoplastic elements. However, both materials have their drawbacks. For example, in the case of wrapped steel cables, while inexpensive to manufacture, metal particles may cling to the wrapped steel tuning cables, eventually damaging the pump and valves, and reducing the performance of the tuning cable. Thermoplastic tuning cables are costly to manufacture.

In determining the optimal material for use in manufacturing power steering tuning cables, three main physical characteristics of the materials are considered. The ultimate or tensile strength, the elongation and the modulus (stress over strain) of materials are analyzed. Based upon these characteristics, the physical characteristics of Teflon® have made it a suitable material for use in the high temperature and extreme chemical environment associated with power steering tuning cables. Other materials, including cross-linked thermoplastic materials, are known in the art and have been used for power steering hoses, but have not been utilized to manufacture tuning cables due to the superior performance of Teflon®. However, as stated above, Teflon® is a costly material.

SUMMARY OF THE INVENTION

The present invention relates to a tuning cable assembly comprising a reinforced tube, and a tuning cable placed within the reinforced tube. The tuning cable is preferably formed from a thermoset or cross-linked thermoplastic material and includes a narrow annular cavity formed between the inner surface of the reinforced tube and the outer surface of the tuning cable.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
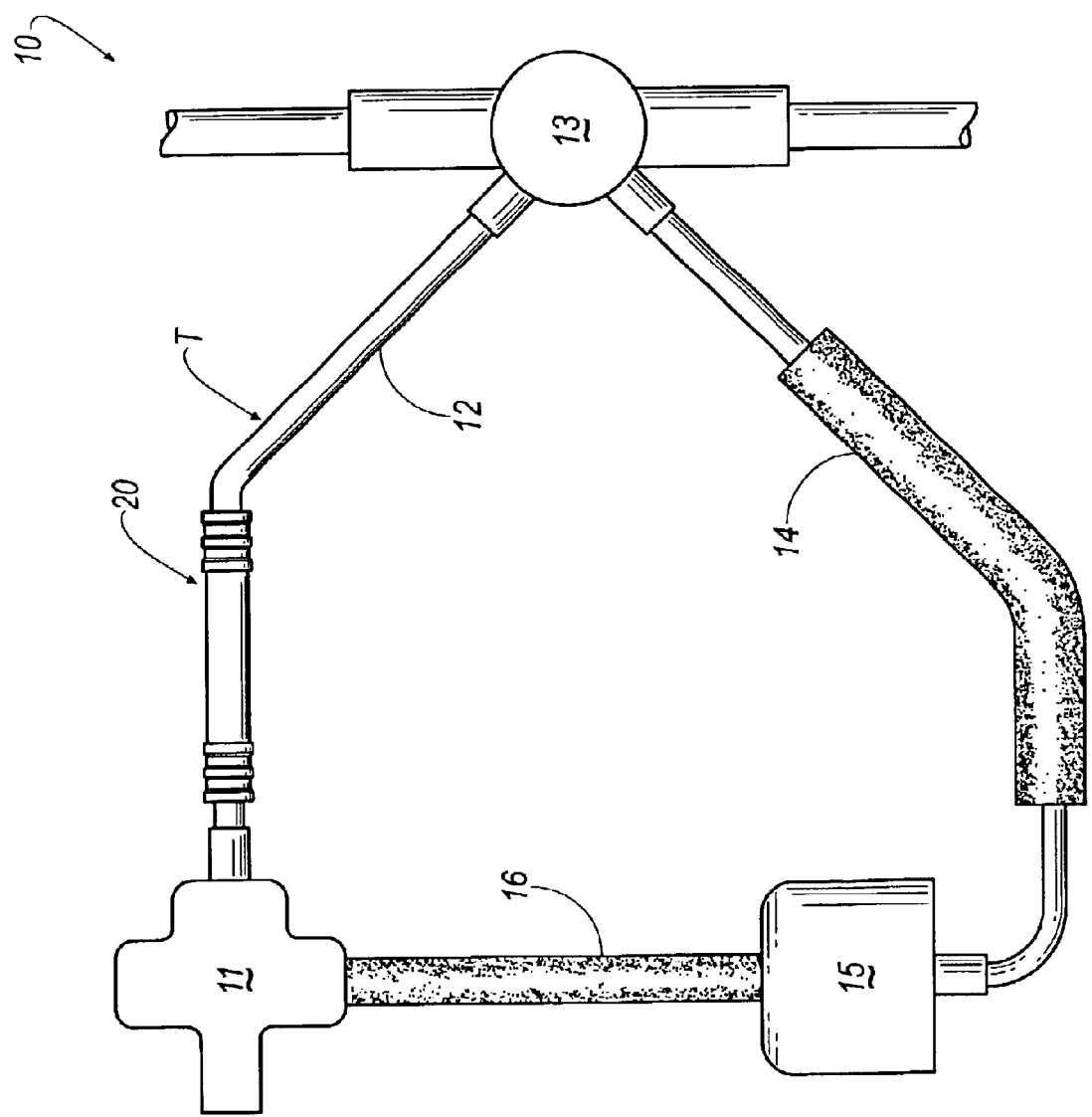
FIG. 1 is an automotive power steering system according to an embodiment of the present invention illustrating one tuning cable.

Referring to FIG. 1, a simplified representation of a closed-loop automotive power steering system 10 illustrates one environment for use of an inventive tuning cable assembly 20 of the present invention. While a close-looped system is illustrated, the present invention may be used in alternative environments subjected to undesirable pressure fluctuations. In the illustrated embodiment, a power steering pump 11 generates pressure ripples that are transmitted through the closed-loop system 10 by way of a pressure line 12, a power steering gear 13, a return line 14, a reservoir 15, and through a supply line 16 back to the power steering pump 11.

Figure 2:
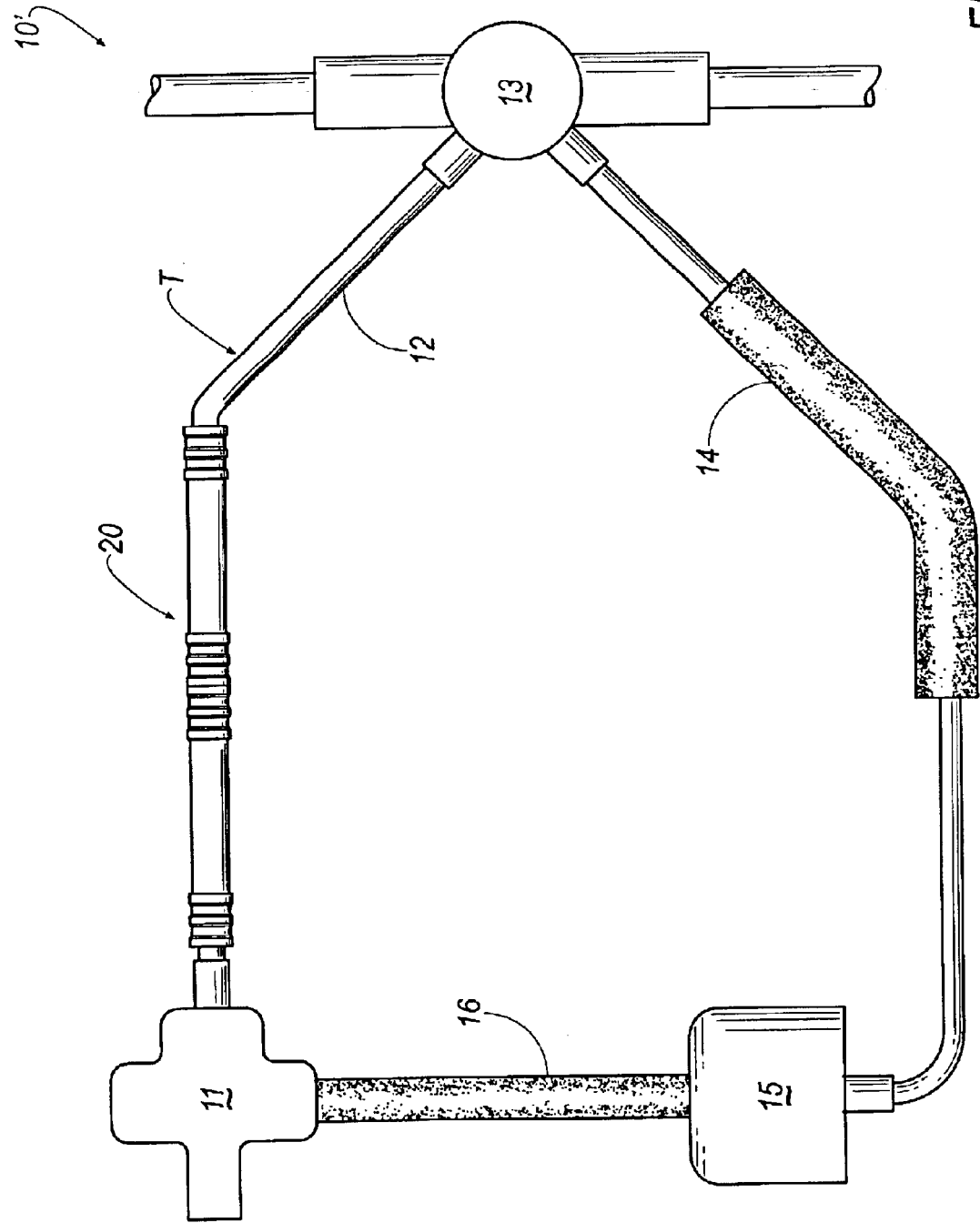
FIG. 2 is an automotive power steering system according to an alternate embodiment of the present invention illustrating the use of two tuning cables in series.

To reduce the pressure ripples generated from the power steering pump 11 before the pressure ripples reach the power steering gear 13 via the pressure line 12, a power steering tuning cable assembly, generally shown at 20, is illustrated as being disposed in the pressure line 12 between the power steering pump 11 and the power steering gear 13. Although the power steering tuning cable assembly 20 has been illustrated in FIG. 1 as being disposed between the power steering pump 11 and the power steering gear 13, the power steering tuning cable 20 can be disposed in alternative locations within system 10 including, for example, within return line 14 between the power steering gear 13 and the reservoir 15 to reduce vibration downstream of power steering gear 13. In some cases it may be desirable to have multiple tuning cable assemblies 20 such as that illustrated in FIG. 2 with respect to a system 10' wherein two tuning cable assemblies 20 are disposed in series within pressure line 12 between power steering pump 11 and power steering gear 13.

Figure 3:
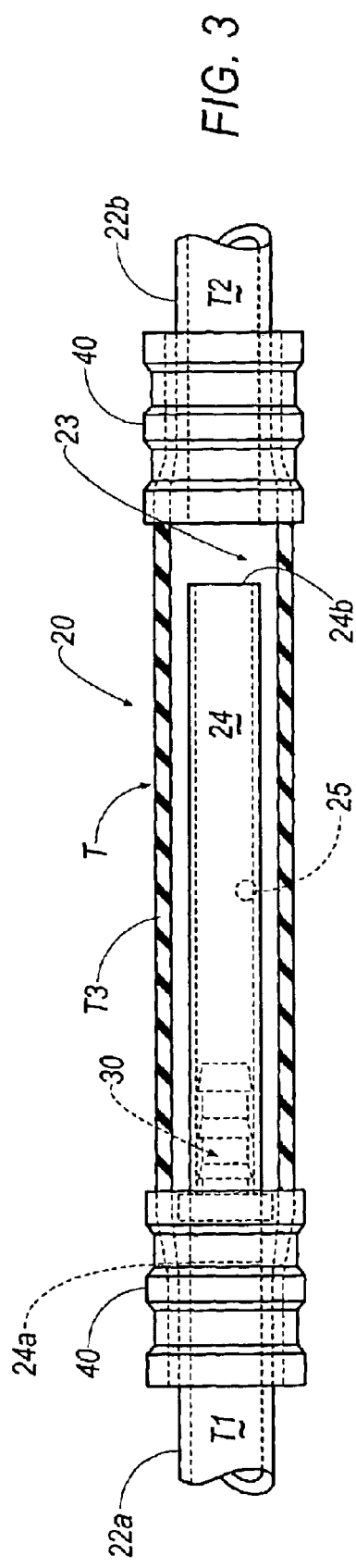
FIG. 3 is a cut away of a thermoset power steering tuning cable assembly according to a first embodiment of the present invention.

FIG. 3 illustrates in greater detail a tuning cable assembly 20 according to a first embodiment of the present invention. Cable assembly 20 comprises a first tubing element T1, a second tubing element T2, and third reinforced tubing element T3 disposed between tubing elements T1 and T2 and including a coupling 40 disposed at opposing ends of tubing element T3. Tubing T has an inlet end 22a and an outlet end 22b in relation to tubing element T3. Thus, in the illustrated embodiment, it is assumed that fluid flows downstream from tubing element T1 through reinforced tubing element T3 and into tubing element T2. In some uses, however, fluid flow may be in the opposite direction. Thus, the nomenclature of "inlet end" and "outlet end" are for illustration only. The tubing T may be made from a polymeric material, as shown in the illustrated embodiment, or may be made from a metal alloy. While not required, tubing T is shown with a generally cylindrical cross-sectional configuration.

Disposed within reinforced tubing element T3 is a hollow tuning cable 24 having an inlet end 24a and an outlet end 24b downstream of the inlet end 24a. A connector 30 associated with the tuning cable 24 works in concert with one of the couplings 40 to secure the tuning cable 24 to tubing T. A narrow annular cavity 23 is formed between an outer periphery of tuning cable 24 and an inner periphery of reinforced tubing element T3.

As illustrated in FIGS. 3 through 6, the connector 30 can be made of metal, such as stainless steel, brass or aluminum, or of a suitable plastic or polymeric material. The connector 30 includes a hollow portion 32 that provides a secure connection between tubing T and the tuning cable 24, and allows fluid to flow from the inlet end 22a of tubing T into inlet end 24a of the tuning cable 24. The hollow portion 32 of the connector 30 is secured in the inlet end 22a of tubing T by inserting the hollow portion 32 of the connector 30 into the inlet end 22a. A collar 38 is provided on the outer periphery of the connector 30 and abuts the inlet end 22a of tubing T when the connector 30 is fully inserted into the tubing T. In order for the connector 30 to fit within the inlet end 22a of the tubing, the inner diameter of the inlet end 22a of the tubing T must generally be larger than the outer diameter of the hollow portion 32 of the connector 30 although a friction fit is also possible. At the opposite end of the hollow portion 32 is the end 36 of the connector 30. The end 36 of the connector 30 can be tapered inwardly to facilitate insertion of the connector 30 into inlet end 24a of the tuning cable 24. Intermediate the hollow portion 32 and the end 36 of the connector 30 is a barbed or ridged portion 35 with barbs or ridges 34 thereon. The tuning cable 24 is secured to the connector 30 by the barbs or ridges 34 of the barb or ridge portion 35. It can be appreciated that the present invention is not limited to barbs or ridges but may have any configuration that will secure the tuning cable 24 to the connector 30. Either end of the tuning cable 24 may be connected to the tubing T via the connector 30; in the illustrated embodiments of the present invention, the inlet end 24a of the tuning cable 24 is connected in fluid communication with the tubing T via the connector 30.

Finally, coupling 40 is used to secure the tubing T and the connector 30. In the illustrated embodiment, the tubing elements T1 and T3 are crimped by compressing coupling 40 from an unloaded orientation having a first inner radial diameter to a permanent loaded orientation having a second inner radial diameter less than the first, the crimping action also acting to firmly secure connector 30 between the inner surface of the coupling 40 and the outer surface of the connector 30. The coupling 40 can be made of a metal, such as stainless steel, brass or aluminum, or of a suitable hard polymeric material.

Referring now specifically to the embodiment of FIG. 3, the tuning cable 24 does not extend all the way from the inlet end 22a to the outlet end 22b, but stops short of the outlet end 22b. The present invention can be practiced with the tuning cable 24 ending at any desired position within the reinforced tubing element T3. Thus, the length of tuning cable 24 may be optimized depending on the environment of use to minimize any fluid rippling. Fluid make up, its speed (e.g., the power of pump 11), the temperature of the fluid, the speed of sound in the fluid and the frequency response are examples of factors influencing the length of tuning cable 24. Although either the inlet end 22a or the outlet end 22b of the tubing T can be connected to the tuning cable 24, in the illustrated embodiment of the present invention, the inlet end 22a is connected to the tuning cable 24 via the connector 30.

In addition to the open end 24b, or as an alternate embodiment of the present invention, the tuning cable 24 may have one or more apertures or holes 25 that allow the fluid to enter and exit the cavity 23 from the tuning cable 24. The aperture or hole 25 is shown to have a circular cross-sectional configuration, however, it can be appreciated that the aperture or hole 25 can be of any desired shape. In addition, it can be appreciated that the present invention can be practiced with various numbers and arrangements of apertures or holes 25. For example, as with the length of tuning cable 24, the number and size of apertures or holes 25 may vary as a function of the same parameters noted above. Further, the apertures or holes 25 can be provided on one side of the tuning cable 24, on opposing sides of the tuning cable 24 or about its entire periphery as determined as a result of the operating conditions and noise suppression desired.

Figure 4:
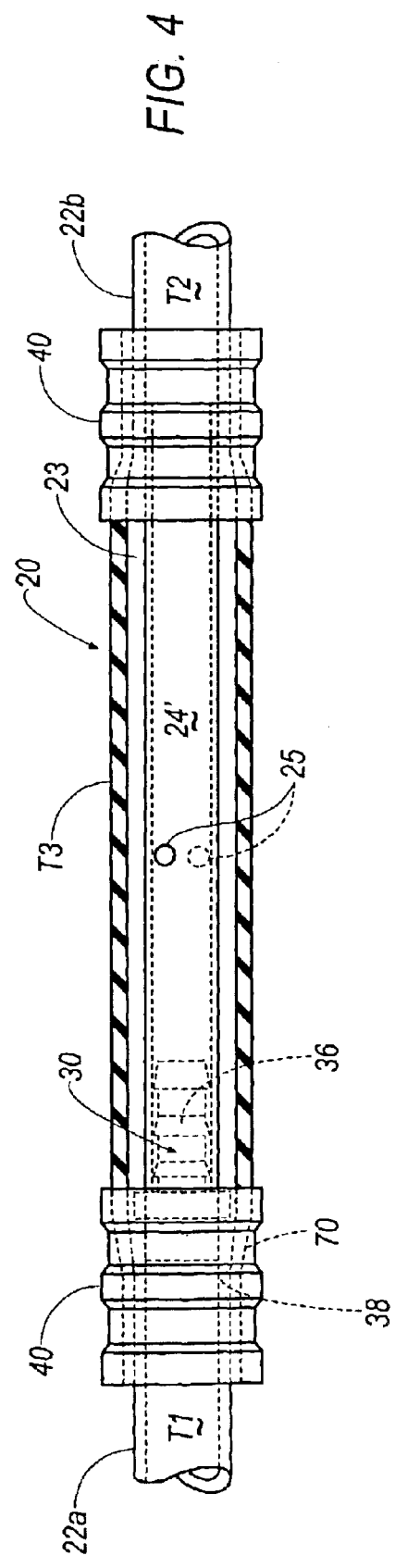
FIG. 4 is a cut away view of a thermoset power steering tuning cable assembly according to an alternate embodiment of the present invention.

Referring to FIG. 4, an alternate embodiment of the present invention is illustrated. In this embodiment of the present invention, the tuning cable 24' extends continuously from the inlet end 22a to the outlet end 22b of the tubing T. While not illustrated, a second connector 30 may be disposed between tubing elements T3 and T2. Such an approach may be desirable particularly if the tuning cable 20 has an extended length or the operational conditions may result in vibration or associated movement of tuning cable 24 within reinforced tubing element T3. The remaining features of FIG. 3 are substantially incorporated into the illustrated embodiment of FIG. 4.

Figure 5:
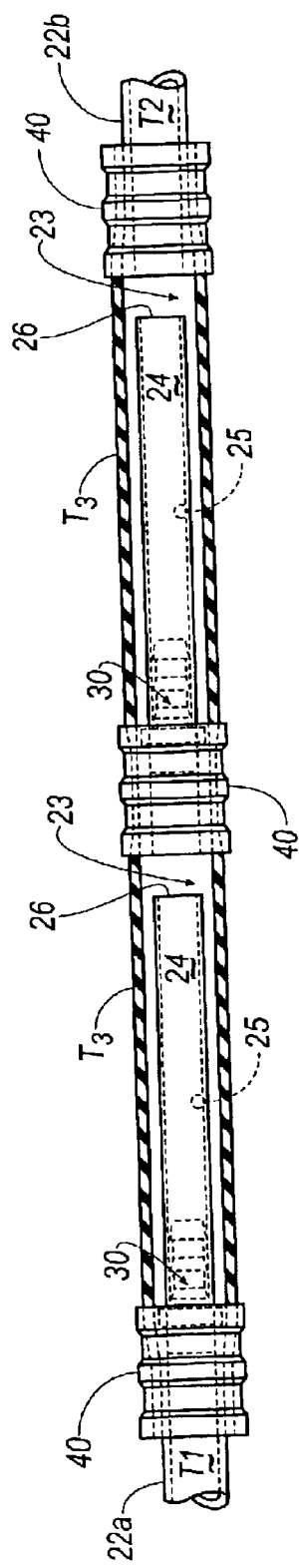
FIG. 5 is a cut away view of a thermoset power steering tuning cable assembly according to a further alternate embodiment of the present invention.
Figure 6:
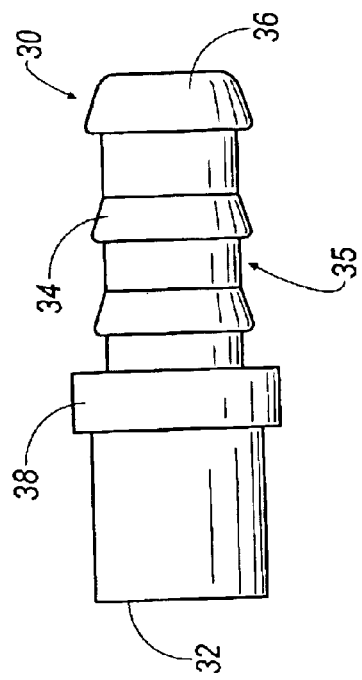
FIG. 6 is an expanded view of a connector in accordance with the present invention.

Referring to FIG. 5, another embodiment of the present invention is illustrated. Power steering tuning cable assemblies 20 can be connected in series, in a manner similar to that described in conjunction with FIGS. 3 and 4.

Referring to FIGS. 1–6, the tuning cable 24 is preferably made from a thermoset material, particularly when used in the environment of a power steering system. The thermoset material offers advantages in creep and melting temperature characteristics over thermoplastic power steering tuning cables. The thermoset material does not have a melting temperature in a region of possible operation. Therefore, concerns associated with extremely high fluid temperatures outside the range of normal operations will not effect the performance of the thermoset power steering tuning cable 24. In addition, thermoset materials are generally less expensive than thermoplastic materials.

In an alternate embodiment of the present invention, the tuning cable 24 is made of a cross-linked thermoplastic material. Cross-linking thermoplastic material with even less expensive material causes the thermoplastic material to undergo a chemical reaction resulting in a cross-linked thermoplastic material. The cross-linked thermoplastic material further reduces the cost of the tuning cable 24 while maintaining substantially similar performance characteristics as thermoplastic or thermoset tuning cables. Additionally, the cross-linked thermoplastic material will still be able to withstand the extreme temperature and chemical environments of fluids associated with steering applications, The thermoplastic material used in the cross-linking process can be any thermoplastic material having reactive sites, such as —NCO, —NH$_2$, or —OH, along the polymer chain. Examples of such thermoplastic material include, but are not limited to, nylon 6, nylon 6/6, nylon 4, nylon 11, nylon 12, nylon 6/12, and nylon 6/10. Ideally, a power steering tuning cable 20 in accordance with the present invention is made from the nylon 6 family. However, the thermoplastic material is not limited to the material listed above and may be any thermoplastic material capable of undergoing a cross-linking reaction in the presence of a cross-linking agent. The cross-linking agent of the present invention can be any suitable polyfunctional compound which reacts with the reactive sites on the thermoplastic material to cross-link the thermoplastic polymer. The preferred cross-linking agent is an isocyanate which contains at least 2.1, preferably more, functional groups which react with the reactive sites on the thermoplastic polymer.

The cross-linking agent may be cross-linked with the thermoplastic material during the extrusion process. The extruder is maintained at a temperature sufficient to heat the thermoplastic polymer and the cross-linking agent to a temperature where they become very reactive. The thermoplastic polymer and the cross-linking agent begin to cross-link forming an extruded cross-linked thermoplastic polymer which has the physical characteristics necessary for use in a high temperature and harsh chemical environment.

Operationally, a thermoset or a cross-linked thermoplastic tuning cable 24 provides a number of additional advantages over the prior art. The amplitude and frequency of the pressure ripples within the tuning cable 24 effects the level of audible noise generated from the fluid; the greater the amplitude or frequency of the pressure ripples, the louder the audible noise. In contrast to the known teachings, the inventor has determined that tuning cables 24 formed from a thermoset material or a cross-linked thermoplastic material are able to lower the frequency of the pressure ripples in the tuning cable, effectively lowering the level of audible noise. It turns out that the speed of sound is much greater for metals than for soft polymers. The metal and thermoplastic materials, such as Teflon®, currently used to manufacture tuning cables have similar sound wave speeds and similar levels of audible noise. Further, tuning cables 24 formed from a thermoset material or a cross-linked thermoplastic material may require a shorter cable length than metal or thermoplastic tuning cables to provide the same level of noise reduction. The result is a tuning cable 24 that has a substantially similar performance of a thermoplastic or metal tuning cable; however, the thermoset or cross-linked thermoplastic tuning cable 24 requires less material, resulting in cost savings, weight savings and space savings. Moreover, the system 10 may be used within a greater confined space and shorter longitudinal extents are necessary.

While cross-linked thermoplastics are commercially available and used in the art to manufacture power steering hoses, the physical characteristics of cross-linked thermoplastics were not thought to be ideal for power steering tuning cables. The physical characteristics of a cross-linked thermoplastic are very different from the physical characteristics of Teflon®. For example, nylon 6 has an approximate ultimate strength of 5900 psi and an approximate elongation value of 225%. Teflon®) has an approximate ultimate strength of 3000–5000 psi and an approximate elongation value of 300–500%. The inventor observed that after undergoing the cross-linking process, cross-linked nylon 6 maintains the same physical characteristics as nylon 6. Through experimentation, the inventor has determined that a cross-linked thermoplastic, such as cross-linked nylon 6, tuning cable performs as well as a Teflon® tuning cable, but at a substantially lower cost.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A tuning cable assembly, comprising:
   a reinforced tube;
   a tuning cable placed within said reinforced tube, where said tuning cable is comprised of a thermoset material; and
   a narrow annular cavity, where said cavity is formed between the inner surface of said reinforced tube and the outer surface of said tuning cable.

2. A tuning cable assembly according to claim 1, wherein said tuning cable assembly further includes a connector for connecting said reinforced tube and said tuning cable, where said connector comprises a hollow portion adjacent a first end, a barbed or ridge portion adjacent a second end, and a collar positioned intermediate said hollow portion and said barbed or ridged portion.

3. A tuning cable assembly according to claim 1, wherein said reinforced tube comprises an inlet end and an outlet end.

4. A tuning cable assembly according to claim 3, wherein at least one of said inlet end and said outlet end of said reinforced tube is connected to said tuning cable using said connector, said collar of said connector providing an abutment surface for said end and said tuning cable respectively.

5. A tuning cable assembly according to claim 1, wherein said tuning cable is provided with at least one aperture through a peripheral surface of said tuning cable.

6. A tuning cable assembly, comprising:
   a reinforced tube;
   a tuning cable placed within said reinforced tube, where said tuning cable is comprised of a cross-linked thermoplastic material; and
   a narrow annular cavity, where said cavity is formed between the inner surface of said reinforced tube and the outer surface of said tuning cable.

7. A tuning cable assembly according to claim 6, wherein said cross-linked thermoplastic material is capable of undergoing a cross-linking reaction in the presence of a cross-linking agent.

8. A tuning cable assembly according to claim 6, wherein said cross-linked thermoplastic material is a material from the nylon family of plastics.

9. A tuning cable assembly according to claim 6, wherein said tuning cable assembly further includes a connector for connecting said reinforced tube and said tuning cable, wherein said connector comprises a hollow portion adjacent a first end, a barbed or ridge portion adjacent a second end, and a collar positioned intermediate said hollow portion and said barbed or ridged portion.

10. A tuning cable assembly according to claim 6, wherein said reinforced tube comprises an inlet end and an outlet end.

11. A tuning cable assembly according to claim 10, wherein at least one of said inlet end and said outlet end of said reinforced tube is connected to said tuning cable using said connector, said collar of said connector providing an abutment surface for said end and said tuning cable respectively.

12. A tuning cable assembly according to claim 6, wherein said tuning cable is provided with at least one aperture through a peripheral surface of said tuning cable.

13. A tuning cable assembly comprising:
   a reinforced tube;
   a tuning cable placed within said reinforced tube, where said tuning cable comprises a material selected from the group consisting of a thermoset or a cross-linked thermoplastic material; and a narrow annular cavity, where said cavity is formed between the inner surface of said reinforced tube and the outer surface of said tuning cable.

14. A tuning cable assembly according to claim 13, wherein said cross-linked thermoplastic material is capable of undergoing a cross-linking reaction in the presence of a cross-linking agent.

15. A tuning cable assembly according to claim 13, wherein said cross-linked thermoplastic material is a material from the nylon family of plastics.

16. A tuning cable assembly according to claim 13, wherein said tuning cable assembly further includes a connector for connecting said reinforced tube and said tuning cable, where said connector comprises a hollow portion adjacent a first end, a barbed or ridge portion adjacent a second end, and a collar positioned intermediate said hollow portion and said barbed or ridged portion.

17. A tuning cable assembly according to claim 13, wherein said reinforced tube comprises an inlet end and an outlet end.

18. A tuning cable assembly according to claim 17, wherein at least one of said inlet end and said outlet end of said reinforced tube is connected to said tuning cable using said connector, said collar of said connector providing an abutment surface for said end and said tuning cable respectively.

19. A tuning cable assembly according to claim 13, wherein said tuning cable is provided with at least one aperture through a peripheral surface of said tuning cable.

* * * * *